United States Patent [19]
Tomura et al.

[11] Patent Number: 5,493,330
[45] Date of Patent: Feb. 20, 1996

[54] TELECINE APPARATUS UTILIZING AN EQUAL-INTERVAL PULL-DOWN TECHNIQUE

[75] Inventors: Masaharu Tomura; Soichi Komatsu, both of Kanagawa, Japan

[73] Assignee: Sony Corporation, Tokyo, Japan

[21] Appl. No.: 344,523

[22] Filed: Nov. 23, 1994

Related U.S. Application Data

[63] Continuation of Ser. No. 15,421, Feb. 9, 1993, abandoned.

[30] Foreign Application Priority Data

Feb. 12, 1992 [JP] Japan ................................ 4-025367

[51] Int. Cl.$^6$ ........................................ H04N 3/40
[52] U.S. Cl. ........................................ 348/102; 348/105
[58] Field of Search ................................ 348/96, 97, 100, 348/102, 911, 459, 105

[56] References Cited

U.S. PATENT DOCUMENTS

| | | | |
|---|---|---|---|
| 3,584,149 | 6/1971 | Flory | 358/215 |
| 4,310,856 | 1/1982 | Poetsch | 358/214 |
| 4,571,629 | 2/1986 | Horio et al. | 358/225 |
| 4,597,015 | 6/1986 | Johnson | 358/225 |
| 4,688,099 | 8/1987 | Funston | 358/214 |
| 4,755,875 | 7/1988 | Fremont | 358/214 |
| 4,800,435 | 1/1989 | Ikeda et al. | 358/213.19 |
| 4,814,885 | 3/1989 | Beard | 358/214 |
| 5,084,755 | 1/1992 | Ozaki | 358/214 |
| 5,119,191 | 6/1992 | Van Den Heuvel | 358/97 |
| 5,204,744 | 4/1993 | Akiyama | 358/140 |
| 5,249,056 | 9/1993 | Foung et al. | 358/214 |

FOREIGN PATENT DOCUMENTS

| | | |
|---|---|---|
| 0437850 | 7/1991 | European Pat. Off. . |
| 1232133 | 5/1971 | United Kingdom . |

OTHER PUBLICATIONS

Patent Abstracts Of Japan, vol. 7, No. 229 (E-203) 12 Oct. 1983 & JP-A-58 117 776 (Sony KK) 13 Jul. 1983.

*Primary Examiner*—Wendy R. Greening
*Attorney, Agent, or Firm*—William S. Frommer

[57] ABSTRACT

In a telecine apparatus for converting a light passed through a film into a video signal comprises a transporting device for transporting the film intermittently, operation of a shutter is controlled so that a light from an irradiating device becomes incident on a solid state image sensing element of odd and even simultaneous exposure and sequential-read out system during a period between a storage starting timing of a signal of an odd field of the solid state image sensing element and a read-out timing of a signal of an even field or during a period between a storage starting timing of a signal of an even field of the solid state image sensing element and a read-out timing of a signal of an even field. Further, operation of the transporting device is controlled such that a timing at which the film is intermittently transported becomes the equal interval. Furthermore, an address signal corresponding to a field frequency of a standard television system is supplied to the memory so that the memory is controlled so as to output the video signal of the field frequency of the standard television system.

10 Claims, 6 Drawing Sheets

TELECINE APPARATUS UTILIZING AN EQUAL-INTERVAL PULL-DOWN TECHNIQUE

This application is a continuation of application Ser. No. 08/015,421, filed Feb. 9, 1993 now abandoned.

BACKGROUND OF THE INVENTION

1. Field of the Invention

The present invention relates to a telecine apparatus and, more particularly, to a telecine apparatus of an equal-interval pull-down system in which a film can be pulled down at low speed.

2. Description of the Prior Art

A word "telecine" is a compound word of television and cinema and generally refers to an apparatus which converts a film image of movie or the like into a television signal. The present invention defines a telecine apparatus as an apparatus that converts an image information stored in an intermediate material into a video signal.

Figure 1:
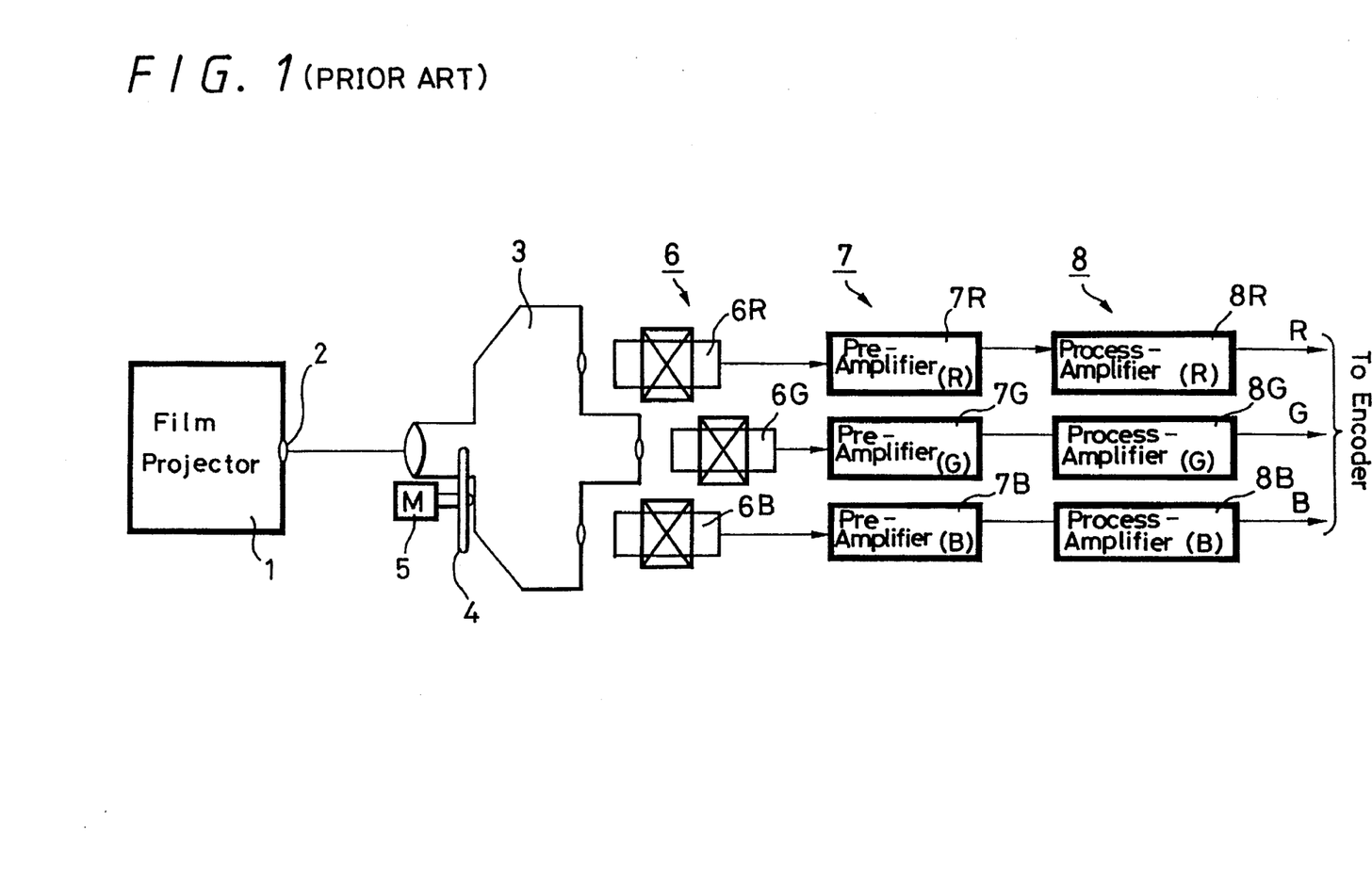
FIG. 1 is a block diagram showing an example of a conventional telecine apparatus.

Japanese Laid-Open Patent Publication No. 58-182384 describes in detail a conventional telecine apparatus. FIG. 1 of the accompanying drawings shows a block diagram of a conventional telecine apparatus serving as a three-tube film image pickup apparatus.

As shown in FIG. 1, there is provided a film projector 1 which includes a 16-mm film that was already photographed and a film pull-down mechanism which will be described later on. An image information from the film projector 1 is projected through a lens 2 onto a spectral system 3. The spectral system 3 includes a shutter 4 that interrupts the film image information projected from the film projector 1. The shutter 4 is driven by a drive motor (M) 5. Further, the spectral system 3 includes a dichroic mirror (not shown) by which an incident light is analyzed into three primary colors of R (red), G (green) and B (blue) and projected onto a picture screen of a camera tube 6 such as Saticon or the like for three primary colors R, G and B.

Film image informations, photoelectrically converted by the camera tubes 6R, 6G, 6B for three primary colors R, G, B, are respectively applied to pre-amplifiers 7R, 7G and 7B, in which they are enhanced in S/N (signal-to-noise) ratio and then supplied to process-amplifiers 8R, 8G and 8B, respectively. The process-amplifier 8 processes the image informations in a predetermined processing fashion such as mixing of blanking, black level clipping, gain control, pedestal level adjustment, shading correction, gamma correction or the like. Then, the image informations thus processed by the process-amplifiers 8R, 8G, 8B are supplied to an encoder or the like and are thereby converted into an NTSC television video signal.

A standard speed of the 16-mm film or the like, for example, is 24 frames per second and is slow as compared with that of the NTSC television system in which 30 pictures (60 fields) are transmitted and displayed per second. Therefore, if the film frame number is converted into a television picture as it is, then a noise such as a so-called shutter bar or the like appears.

To avoid such a drawback, the conventional telecine apparatus adopts a special intermittent driving method. More specifically, during the film is in motion, the shutter 4 is closed to interrupt the light from the film projector 1. Then, the film is transported so that the shutter 4 is opened when the film is not in motion. Then, a still picture information of film is picked up by the camera tube 6. Accordingly, a relation between the radiation of light on the film and the field of the television picture is set as $\frac{1}{24}$ (second)×2 frames=$\frac{1}{60}$×5 fields=$\frac{1}{12}$ (second), i.e., during $\frac{1}{12}$ second, 2 frames of the film correspond to 5 fields of the television video signal.

As a pull-down system for intermittently moving the film so that the film is pulled down, there are known an equal-interval pull-down system and a 2–3 pull-down system.

Figures 2A, 2B:
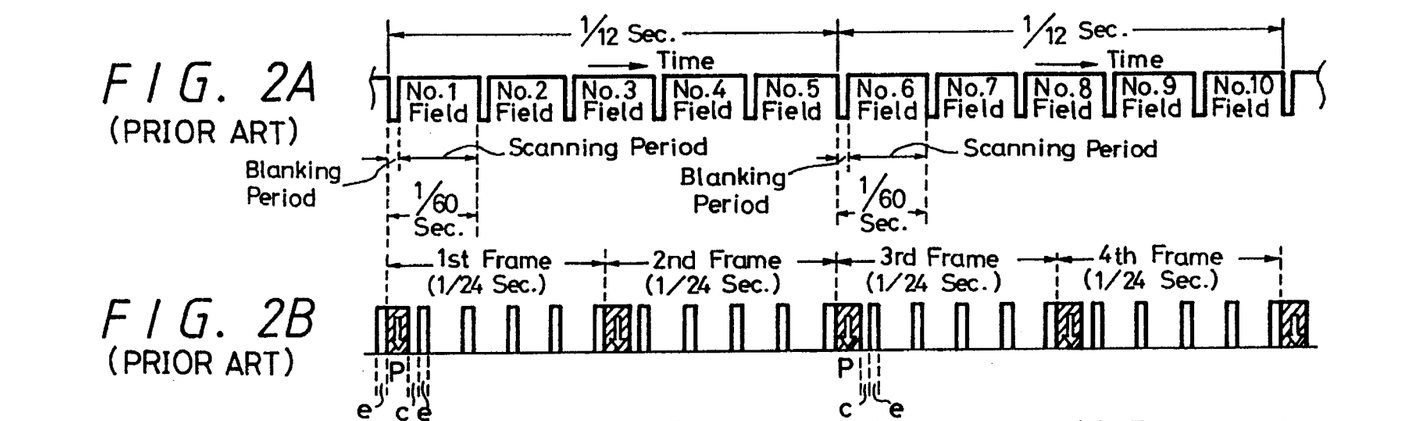
FIGS. 2A through 2D are timing charts used to explain operation of the conventional telecine apparatus shown in FIG. 1, respectively.

The equal-interval pull-down system will be described with reference to FIGS. 2A and 2B. FIG. 2A shows the scanning state of the standard television system such as the NTSC television system or the like. As shown in FIG. 2A, 2 frames of the film are pulled down during $\frac{1}{12}$ second of first to fifth fields. As shown in FIG. 2B, a pull-down period, i.e., P interval occurs at every 2.5 fields of the television video signal. When the film is not in motion, a light from the light source (not shown) is radiated five times per frame by means of recesses or slits formed on the disk of the shutter 4 so that 24 frames of the film and 30 pictures per second of the standard television system are made coincident with each other.

The shortcomings of this equal-interval pull-down system are such that a radiation time is short and that a pull-down speed of the film is high. There is then the problem that perforations of the film will be easily damaged. The 2–3 pull-down system is proposed in order to improve this disadvantage.

Figures 2C, 2D:
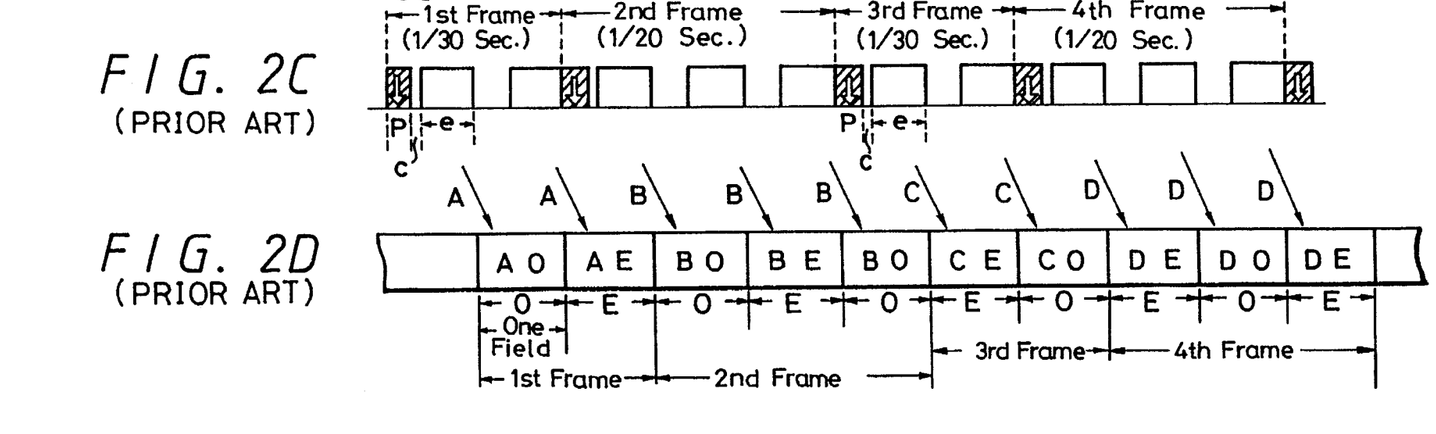

According to the 2–3 pull-down system, the pull-down of film is carried out such that, as shown in FIG. 2C, an odd frame is transported in $\frac{1}{30}$ second and an even frame is transported in $\frac{1}{20}$ second within $\frac{1}{12}$ second cycle. More specifically, in FIG. 2C, a hatched portion P represents a pull-down operation portion, a portion C represents a vibration period following the pull-down operation and a hatched portion e represents a radiation portion. Odd frames 1, 3, 5, ... of the film correspond to 2 fields of the NTSC television video signal or the like. Even frames 2, 4, 6, ... are pulled-down at every 24 frames per second in response to 3 fields of the NTSC television video signal or the like.

FIG. 2D shows the reading state of fields of the television video signal. As shown in FIG. 2D, a first frame A of odd frame of the film is pulled down to an odd field AO and an even field AE of the television video signal, and a second frame B of even frame of the film is pulled down to an odd field BO, an even field BE and an odd field BO of the television video signal. Similarly, a third frame C of an odd frame is pulled down to an even field CE and an odd field CO of the television video signal, and a fourth frame D of an even frame is pulled down to an even field DE, an odd field DO and an even field DE of the television video signal.

According to the above-mentioned 2–3 pull-down system, although the utilization ratio of light is increased as compared with that of the equal-interval pull-down system, the frame of the film is pulled down at the ratio of 2:3, causing the film pull-down mechanism to become extremely complicated. Also, a vibration thereof becomes large.

As described above, the 2–3 pull-down system and the equal-interval pull-down system both have merits and demerits. In order to simplify the structure of the pull-down mechanism much more, the present invention adopts the equal-interval pull-down system to enable the pull-down mechanism to be smoothly driven intermittently. Further, according to the conventional equal-interval pull-down system, the radiation of light is carried out once per field to read out electric charges so that the film must be pulled down and the shutter must be opened within one field without fail. There is then the disadvantage that the pull-down speed of the film increases to damage the film.

Furthermore, when the image information of the film is picked up by using the camera tubes 7R, 7G and 7B, a time difference of a little less than one field (1/60 second) occurs in storage time at the scanning starting point (upper portion of picture screen) and a scanning ending point (lower portion of picture screen) because electric charges are read out by the scanning of electron beam on the photoelectric conversion layer. There is then the disadvantage that a subtle timing relation between the shutter and the scanning of electron beam must be adjusted.

OBJECTS AND SUMMARY OF THE INVENTION

Therefore, it is an object of the present invention to provide a telecine apparatus in which the aforesaid shortcomings and disadvantages of the prior art can be eliminated.

More specifically, it is an object of the present invention to provide a telecine apparatus in which a pull-down speed of film can be decreased to reduce a burden on the film.

Another object of the present invention is to provide a telecine apparatus whose pull-down mechanism can be simplified in structure.

Still another object of the present invention is to provide a telecine apparatus in which a radiation time of light can be extended.

A further object of the present invention is to provide a telecine apparatus which can reduce the possibility that a film will be damaged.

A still further object of the present invention is to provide a telecine apparatus in which a picture can be prevented from being fluctuated.

A yet further object of the present invention is to provide a telecine apparatus which can improve a picture quality.

According to an aspect of the present invention, there is provided a telecine apparatus for converting a light passed through a film into a video signal which comprises a transporting device for transporting the film intermittently, a device for irradiating the film with a light, a shutter for selectively interrupting a light from the irradiating device, a solid state image sensing element on which the light passed through the film becomes incident and converting the incident light into an electrical signal, exposure and read-out system of the solid state image sensing element being odd and even line simultaneous exposure and sequential read-out system, a memory for storing an output signal from the solid state image sensing element, and a control circuit for controlling operation of the shutter, operation of the solid state image sensing element and operation of the memory, the control circuit controlling operation of the shutter so that the light from the irradiating device becomes incident on the solid state image sensing element during a period between a storage starting timing of a signal of an odd field of the solid state image sensing element and a read-out timing of a signal of an even field or during a period between a storage starting timing of a signal of an even field of the solid state image sensing element and a read-out timing of a signal of an odd field, controlling operation of the transporting device such that a timing at which the film is intermittently transported becomes the equal interval and controlling operation of the memory such that an address signal corresponding to a field frequency of a standard television system is supplied to the memory and that the memory outputs the video signal of the field frequency of the standard television system.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 4A through 4G are timing charts used to explain operation of the telecine apparatus shown in FIG. 3;

DETAILED DESCRIPTION OF THE PREFERRED EMBODIMENT

A telecine apparatus according to an embodiment of the present invention will hereinafter be described with reference to FIGS. 3 to 6.

Figure 3:
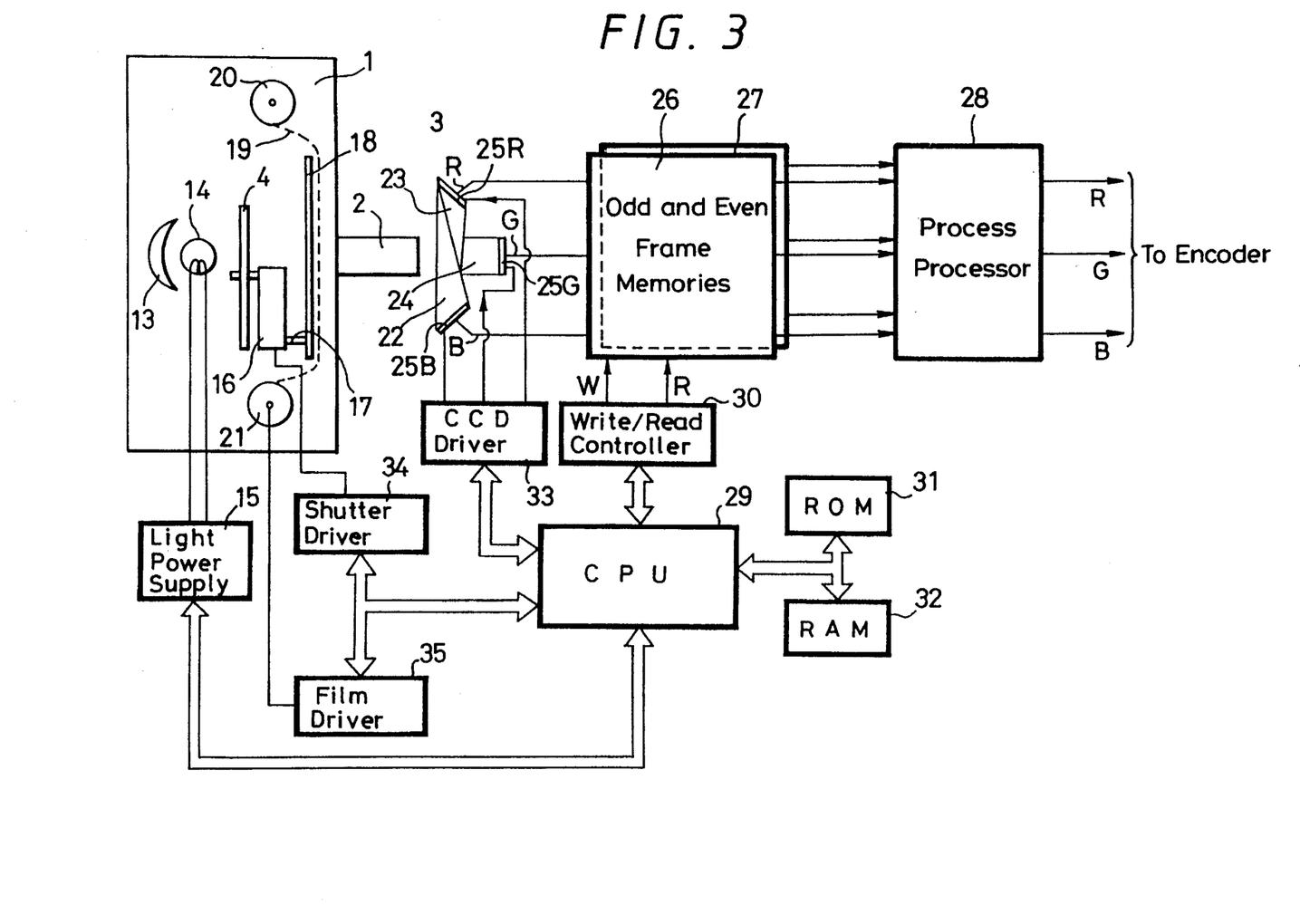
FIG. 3 is a block diagram showing a telecine apparatus according to an embodiment of the present invention.

FIG. 3 is a block diagram showing an overall arrangement of the telecine apparatus according to the present invention. As shown in FIG. 3, there is provided a film projector or projector 1. The film projector 1 has a light source 14 provided within a housing thereof. The light source 14 might be formed of a halogen lamp or the like and is energized by a light power supply 15.

A light from the light source 14 is reflected by a reflection mirror 13 and converged on a lens 2. Between the lens 2 and the light source 14, there are provided the shutter 4 and an aperture 18. The shutter 14 includes a disk-shaped disk which has recesses or windows. Accordingly, a light from the light source 14 travels through the above recesses or windows so that an image information developed on a film 19, which is being intermittently transported along the surface of the aperture 18, is projected through the lens 2 onto a spectral system 3. The film 19 is wound around supply and take-up reels (not shown) via an upper sprocket 20 and a lower sprocket 21. The shutter 4 is rotated by a motor (not shown) or the like provided within a pull-down mechanism 16. A pull-down click 17 is inserted into perforations of the film 19 or the like to intermittently transport the film 19.

A light passed through the lens 2 from the light source 14 becomes incident on a dichroic unit (not shown) disposed within the spectral system 3, in which it is analyzed into three primary colors R, G, B, which are then introduced into R, G, B frame read-out type CCDs (charge coupled devices) 25R, 25G and 25B.

A dichroic prism 22 includes a B reflection surface to irradiate a light of blue color onto the CCD 25B, a dichroic prism 23 includes an R reflection surface to irradiate a light of red color onto the CCD 25R, and a dichroic prism 24 passes a light of green color. When the light of green color is irradiated on the CCD 25G, thus the light from the light source 14 being analyzed into three primary colors R, G and B.

The CCDs 25R, 25G and 25B are of the frame read-out type imagers and are capable of the simultaneous exposure during at least odd and even fields and the sequential reading. That is, the read-out from the CCD is carried out once per frame and a timing thereof has a phase difference of one field, i.e., 180 degrees between the odd line CCD sensor and the even line CCD sensor. The storage time of this sensor is controlled by a sensor gate pulse.

Video information signals, photoelectrically converted by the above-mentioned frame read-out type CCD 25R, 25G, 25B for three primary colors R, G, B, are read-out at the unit of frames and stored in even and odd frame memories 26 and 27. The read and write of the odd and even frame memories 26 and 27 are carried out by a write control signal W and a read control signal R from a write and read controller 30 that is operated under the control of a microcomputer (hereinafter referred to as a CPU) 29. If necessary, 24 frames of the film frame number are converted into 30 frames and then supplied through a process processor 28 to an encoder that converts the video information signal into the NTSC video signal or the like.

The CPU 29 includes ordinary ROM (read-only memory) 31 and RAM (random access memory) 32 to control a CCD driver 33 for driving the CCDs 25R, 25G, 25B, a shutter driver 34 for driving a shutter motor (not shown) or the like that drives the shutter 4, the light power supply 15 and a film driver 35 for transporting the film 19 intermittently.

Operation of the telecine apparatus according to this embodiment will be described hereinafter. Initially, the reason that the pull-down shutter 4 of the film 19 may be opened to irradiate a light from the light source 14 once per frame by using the one frame read-out type CCD of this embodiment will be described with reference to FIGS. 6A through 6D.

Figure 6A:
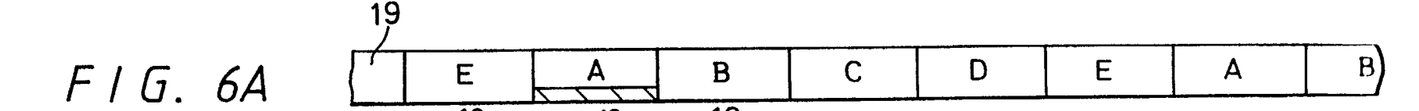
FIGS. 6A through 6D are timing charts used to explain operation of the telecine apparatus shown in FIG. 3.

FIG. 6A shows the case that the 30 frames of the film 19 are converted into 30 pictures, wherein there are illustrated image informations A, B, C, D, E, A, B, C, D, E, ... from first to fifth frames developed on the film 19.

Figure 6B:
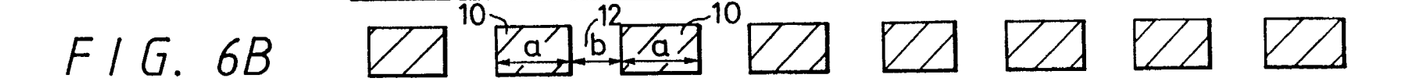

Each of hatched portions 10 in FIG. 6B shows an interval in which the pull-down of the film 19 and the closing of the shutter 4 are carried out by the pull-down mechanism 16. A blank portion 12 shows an interval b in which the shutter 4 is opened to effect the exposure.

Figure 6C:
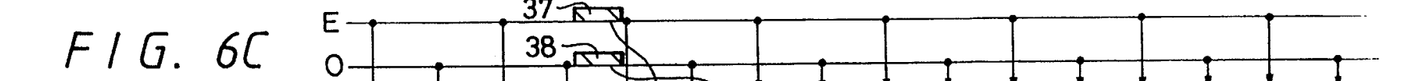

FIG. 6C shows odd and even field gates. Solid circle positions in FIG. 6C represent sensor gate pulses of the frame read-out type CCD. In FIG. 6C, E represents an even sensor gate and O represents an odd sensor gate. The odd and even line sensors have a phase difference of one field, i.e., 180 degrees therebetween as earlier noted. The storage times of these odd and even line sensors fall within a range of from the gate pulse position to the next gate pulse position shown by solid circle positions of the respective sensors. If now the light is irradiated from the light source 14 onto the image information of time less than one field, e.g., the first frame at a timing so that this sensor gate pulse is not sandwiched and the shutter 4 is disposed as shown by hatched portions 10, 10 during a duration of time of more than one field in which both the odd and even sensor gate pulses are sandwiched, then the even line sensor 37 and the odd line sensor 38 are simultaneously exposed during the interval b where the shutter 4 is in its opened state.

Figure 6D:
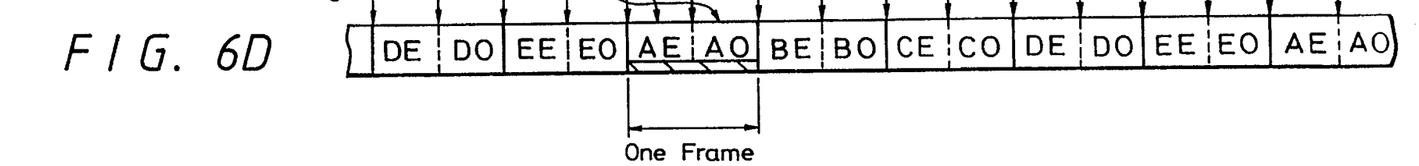

The outputs of the CCDs 25R, 25G and 25B will be described with reference to FIG. 6D. As shown in FIG. 6D, the image information of the first frame of the film 19 stored during the even field time is read out during the next one field period as shown by AE. Then, the image information A of the first frame of the film 19 stored during the odd field time simultaneously with the even field time is read out with a delay of one field as shown by AO, thus the one frame being read out.

According to the above-mentioned arrangement, the pull-down shutter 4 need not be opened within one field (1/60 second) unlike the prior art. The shutter 14 may be opened once within one frame (1/30 second). That is, it is sufficient that the interval a+b may become one frame in FIG. 6B. Accordingly, a time required when the film is pulled down can be extended.

Figure 4A:
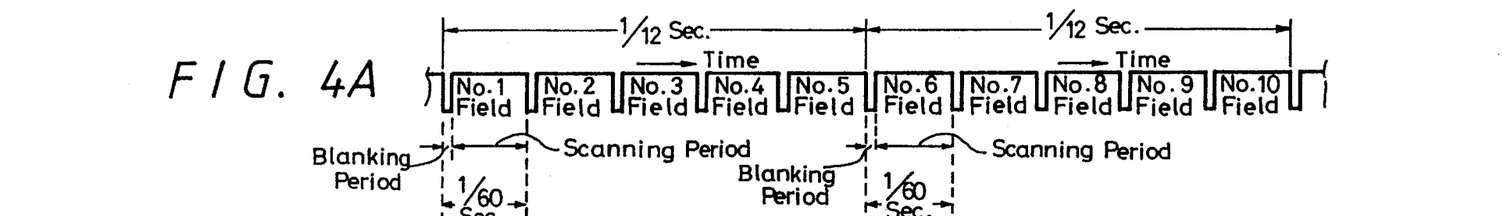
Figures 4B, 4C:
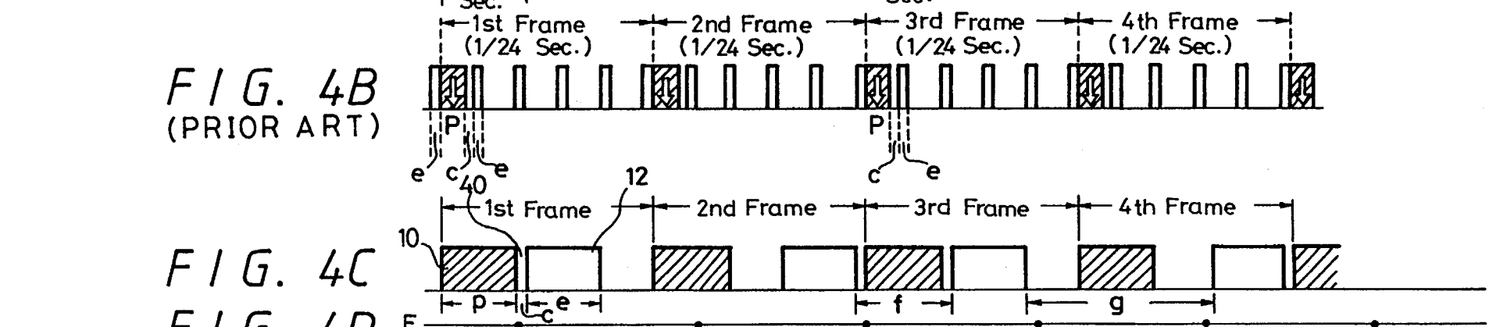

Operation of this embodiment will hereinafter be described with reference to FIGS. 4A to 4G. In this embodiment, the pull-down of the film is carried out according to the equal-interval pull-down system. FIG. 4A shows a scanning waveform of the television signal for reference. FIG. 4B shows a scanning waveform of the conventional equal-interval pull-down system for reference.

According to this embodiment, as shown in FIG. 4C, 2.5 fields of the standard television system correspond to one frame of the film 19 and the cycles of the pull-down periods P become equal in interval, thereby achieving the equal-interval pull-down. That is, in the pull-down portion of the hatched portion 10 in FIG. 4C, the film is intermittently transported only during the period P. In FIG. 4C, reference numeral 40 depicts a portion that is vibrated in the unstable portion during the period C after the pull-down operation.

In FIG. 4C, reference numeral 12 depicts a portion on which the light from the light source 14 is irradiated. A radiation period e in which the exposure is effected is provided once per frame.

Figure 5:
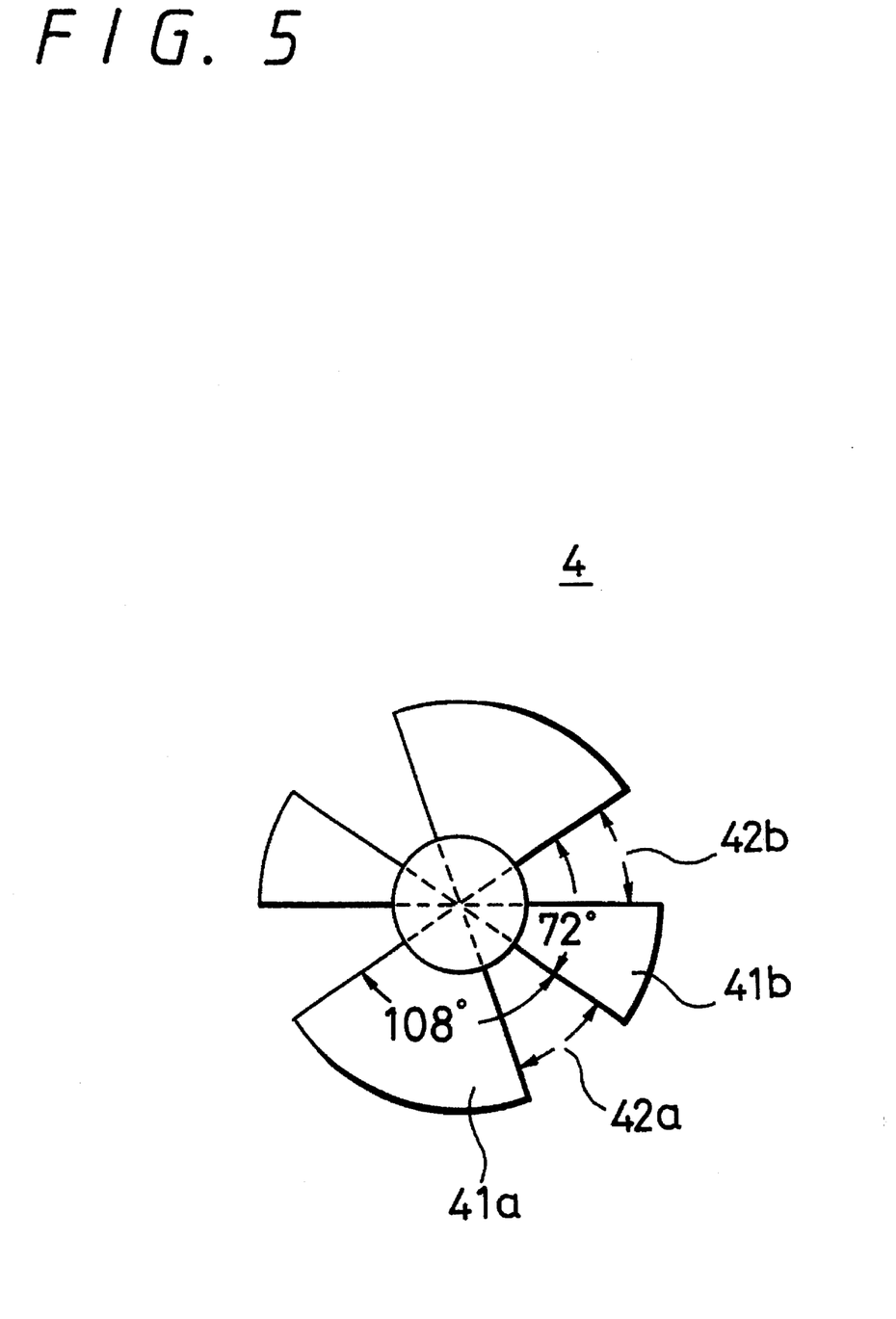
FIG. 5 is a plan view showing an embodiment of a shutter used in the telecine apparatus shown in FIG. 3.

Other intervals f and g depict intervals in which the shutter 4 is closed. Although the closed periods of the shutter 4 become unequal in interval according to this embodiment, if a relation between blades 41a, 41b of 180 degrees of the disk-shaped shutter 4 and slits 42a and 42b is divided into 108° and 72° and the slits 42a, 42b are provided in the ranges of equal angles such that the sensor gate pulse is not sandwiched by the irradiation periods e as shown in FIG. 5, then the shutter unequal periods shown by reference symbols f and g can be closed cyclically.

FIG. 4D shows similar odd and even sensor gate pulses (O and E) in FIG. 6C. During the irradiation period e of each frame, electric charges are simultaneously stored in the odd and even sensors O and E, whereby the pictures of the first and fourth frames are output from the odd sensor gate with a delay of one field as shown in the CCD output of FIG. 4E and the pictures of the first and fourth frames are output from the E sensor gate with a delay of one field as shown in the CCD output shown in FIG. 4E. Pictures of the second and third frames are output from the E sensor gate with a delay of one field and are output from the O sensor gate with a delay of one frame.

Figures 4E, 4F, 4G:
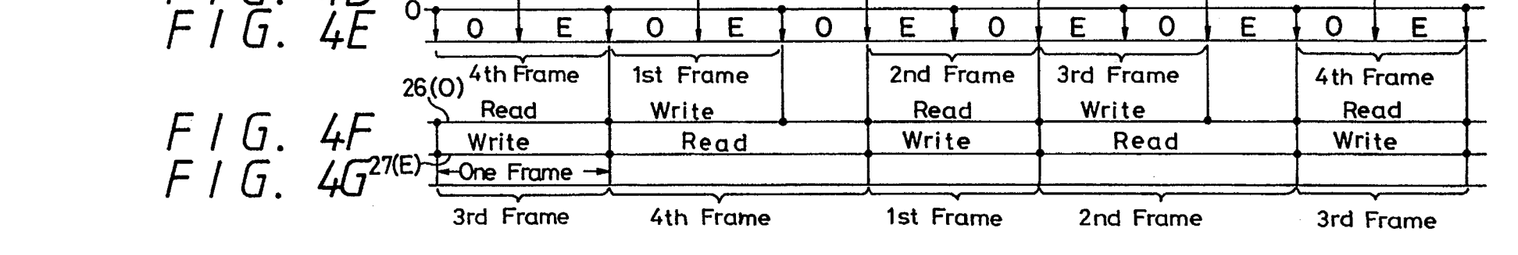

Video informations of respective frames output from the CCDs 25R, 25G, 25B as shown in FIG. 4E are supplied to odd and even two frame memories 26, 26, in which they are read and written at timings shown in FIG. 4F. As a result, the frame conversion is carried out in the odd and even frame memories 26, 27 at timings shown in FIG. 4G, whereby the image of 24 frames/second of the film 19 is converted into the image of 60 fields/second of the NTSC television signal.

In the equal-interval pull-down operation of the film 19, the film driver 35 shown in FIG. 3 drives the pull-down mechanism 16 and also drives the upper and lower sprockets 20, 21, the supply and take-up reels (not shown) or the like. The film driver 35 is controlled by the CPU 29 to pull-down the film 19 at the equal interval.

The light source 14 provided within the film projector 1 is energized by the light power supply 15. When the light source 14 is kept being energized during the telecine apparatus is driven, the light power supply 15 need not be controlled by the CPU 29. Further, the light source 14 may be energized at every frame in the cycle shown in FIG. 4C.

The shutter motor is driven by the shutter driver 34, whereby the shutter 4 is rotated and then closed during the periods f and g shown in FIG. 5. The shutter driver 34 is, of course, controlled by the CPU 29.

The CCD driver 33 also is controlled by the CPU 29, whereby image informations of respective frames are simultaneously stored in the odd and even sensors O and E of the frame read-out CCDs 25R, 25G and 25B during the radiation period and then output from the CCDs 25R, 25G and 25B with delay times of one field and one frame.

Image informations of the first to fourth frames, which are output from the CCDs 25R, 25G, 25B and stored in the odd frame memory 26 and in the even frame memory 27 are written and read out under the control of the write and read controller 30. Under this control, as shown in FIG. 4F, the read and write are alternately carried out in the odd frame memory 26 and in the even frame memory 27, whereby the image of 24 frames/second of the film 19 is converted into the image of 60 fields/second of the NTSC television signal.

According to this embodiment, the CPU 29 controls the shutter 4 so that the light from the light source 4 becomes incident on the CCDs 25R, 25G and 25B during the period between the odd field signal storage starting timing and the even field signal read-out timing of the CCDs 25R, 25G, 25B or the period between the even field signal storage starting timing and the odd field signal read-out timing of the CCDs 25R, 25G, 25B. Further, the CPU 29 controls the transporting means 20, 21 so that the film 19 is intermittently transported at the timing of equal interval. Also, the address signal corresponding to the field frequency of the standard television system is supplied to the odd and even frame memories 26, 27, from which there can be obtained a video signal having an NTSC field frequency.

The process-processor 28 processes the video signal in a proper processing fashion such as mixing of blanking, clipping of black level, control of gain, adjustment of pedestal level, shading correction, gamma correction or the like. The video signal thus processed by the process-processor 28 is supplied to the encoder, in which it is converted into the standard television system video signal such as the NTSC video signal or the like.

Since the telecine apparatus of the present invention is arranged as described above, the irradiation time e can be extended while the pull-down time interval of the film 19 is equal. Further, the pull-down time can be extended. There can be decreased the possibility that the film will be damaged. Therefore, the telecine apparatus of the present invention can protect the film quality from being degraded and provide a satisfactory picture quality. Since the pull-down time is decreased and the pull-down operation is carried out at equal interval, the optical system can be prevented from being vibrated substantially and the picture can be prevented from being fluctuated. Also, a resolution of the picture can be prevented from being lowered. Further, the pull-down mechanism can be simplified in structure.

Furthermore, in the case of the conventional telecine apparatus using a camera tube, since electric charges are read out by scanning an electron beam on a photoelectrical conversion layer, a storage time has a time difference of less than about 1 field between the starting timing point (upper portion of picture) and an ending time point (lower portion of picture). Therefore, a subtle timing adjustment between the shutter and the scanning of electron beam is required. However, according to this embodiment, since the frame conversion is carried out by using the field read-out type CCDs and the field memories, a timing for reading out electric charges has not time difference within one field. Thus, the timing of shutter need not be fine adjusted and the pull-down operation in equal interval can be effected.

According to the telecine apparatus of the present invention, since the film is pulled down once per frame, the pull-down mechanism can be simplified in structure and the irradiation time can be extended. Also, the possibility that the film will be damaged can be reduced and a picture can be prevented from being fluctuated substantially. Therefore, the telecine apparatus of the present invention can provide a picture of satisfactory picture quality.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A telecine apparatus for converting a light passed through a film into a video signal representing a plurality of fields and frames, said apparatus comprising:

transporting means for intermittently transporting said film through a plurality of time intervals, wherein each of said time intervals is the same;

means for irradiating said film with a light so as to produce a light image;

a solid state image sensing element having even line elements and odd line elements for receiving the light image and for converting the received light image into an electrical signal, wherein said solid state image sensing element is operated in a frame read out mode;

memory means for storing the electrical signal from said solid state image sensing element; and control means for controlling activation of said transporting means, and for controlling operation of said solid state image sensing element so that said solid state image sensing element is operated to output the electrical signal of one of said even line elements and said odd line elements during a field period and output the electrical signal of the other of said even line elements and said odd line elements during a field period next to the field period that the electrical signal of one of the even line elements and the odd line elements is output, and for controlling operation of said memory means so that said memory means stores the electrical signal from each said even line elements and said odd line elements and outputs each said electrical signal of said even line elements and said odd line elements at least one time during each frame period and one of said even line elements and said odd line elements at least twice during alternating frame periods so that a number of the fields of the video signal output from said memory means is the same as the number of fields of a standard television system.

2. A telecine apparatus according to claim 1, wherein said film has a normal operating speed of 24 frames per second when a video image recorded thereon is being viewed by an observer, and wherein the number of fields output from said memory means are supplied therefrom at a rate of 60 fields per second.

3. A telecine apparatus according to claim 1, wherein said memory means includes first and second frame memories which read the electrical signal from one of said even line elements and said odd line elements once and read the other of said even line elements and said odd line elements twice.

4. A telecine apparatus according to claim 1, wherein said control means controls the operation of said means for irradiating such that the light is irradiated on said film only once in each frame period so as to produce the light image.

5. A telecine apparatus for converting a light passed through a film into a video signal representing a plurality of fields and frames, said apparatus comprising:

transporting means for intermittently transporting said film through a plurality of time intervals, wherein each of said time intervals is the same;

means for irradiating said film with a light so as to produce a light image;

shutter means for intermittently interrupting the light image;

a solid state image sensing element having even line elements and odd line elements for receiving the light image from said shutter means and for converting the received light image into an electrical signal, wherein said solid state image sensing element is operated in a frame read out mode;

memory means for storing the electrical signal from said solid state image sensing element; and control means for controlling operation of said shutter means so that said shutter means does not interrupt the light image once within one field period of each frame period, and for controlling operation of said transporting means so that said transporting means is activated when said shutter means interrupts the light image, and for controlling operation of said solid state image sensing element so that said solid state image sensing element is operated to output the electrical signal of one of said even line elements and said odd line elements during a field period next to the field period that the shutter means interrupts the image light and output the electrical signal of the other of said even line elements and said odd line elements during a field period next to the field period that the electrical signal of one of the even line elements and the odd line elements is output, and for controlling operation of said memory means so that said memory means stores the electrical signal from each said even line elements and said odd line elements and outputs each said electrical signal of said even line elements and said odd line elements at least one time during each frame period and one of said even line elements and said odd line elements at least twice during alternating frame periods so that a number of the fields of the video signal output from said memory means is the same as the number of fields of a standard television system.

6. A telecine apparatus according to claim 5, wherein said control means controls the operation of said solid state image sensing element and said memory means so that image information signals accumulated in the odd line elements and the even line elements of said solid state image sensing element are stored in said memory means with a time difference corresponding to one field therebetween.

7. A telecine apparatus according to claim 5, wherein said film has a normal operating speed of 24 frames per second when a video image recorded thereon is being viewed by an observer, and wherein the number of fields output from said memory means are supplied therefrom at a rate of 60 fields per second.

8. A telecine apparatus according to claim 5, wherein said memory means includes first and second frame memories which read the electrical signal from one of said even line elements and said odd line elements once and read the other of said even line elements and said odd line elements twice.

9. A telecine apparatus according to claim 5, wherein said control means controls the operation of said shutter means such that the light image is supplied to said solid state image sensing element only once in each said frame period.

10. A telecine apparatus for converting a light passed through a film into a video signal representing a plurality of fields and frames, said apparatus comprising:

transporting means for intermittently transporting said film through a plurality of time intervals, wherein each of said time intervals is the same;

means for supplying light;

shutter means for intermittently allowing the light from the supplying means to be irradiated on said film so as to produce a light image;

a solid state image sensing element having even line elements and odd line elements for receiving the light image from said shutter means and for converting the received light image into an electrical signal and for supplying the electrical signal therefrom with a predetermined delay, wherein said solid state image sensing element is operated in a frame read out mode;

memory means for storing the electrical signal from said solid state image sensing element; and control means for controlling operation of said shutter means so that said shutter means allows the light from the supplying means to be irradiated on said film only once in each frame period and does not interrupt the light once within one field period of each frame period, and for controlling operation of said transporting means so that said transporting means is activated when said shutter means interrupts the light image, and for controlling operation of said solid state image sensing element so that said solid state image sensing element is operated to delay the electrical signal of one of said even line elements and said odd line elements by one field period so that the respective electrical signal is output in the first field period after the shutter means allows the light to be irradiated on said film and to delay the electrical signal of the other of said even line elements and said odd line elements by one frame period so that the respective electrical signal is output in the second field period after the shutter means allows the light to be irradiated on said film, and for controlling operation of said memory means so that said memory means stores the electrical signal from each said even line elements and said odd line elements and outputs each said electrical signal of said even line elements and said odd line elements at least one time during each frame period so that a number of the fields of the video signal output from said memory means is the same as the number of fields of a standard television system.

* * * * *